(12) United States Patent
Yamaguchi et al.

(10) Patent No.: US 10,895,039 B2
(45) Date of Patent: *Jan. 19, 2021

(54) PROCESS FOR MANUFACTURING RECYCLED PULP FROM USED SANITARY GOODS

(71) Applicant: UNICHARM CORPORATION, Ehime (JP)

(72) Inventors: Masashi Yamaguchi, Kanonji (JP); Takayoshi Konishi, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,046

(22) Filed: Mar. 14, 2019

(65) Prior Publication Data

US 2019/0211502 A1 Jul. 11, 2019

Related U.S. Application Data

(62) Division of application No. 15/024,713, filed as application No. PCT/JP2014/073345 on Sep. 4, 2014, now Pat. No. 10,280,560.

(30) Foreign Application Priority Data

Oct. 30, 2013 (JP) .................................. 2013-225937

(51) Int. Cl.
| | | |
|---|---|---|
| *D21C 5/02* | (2006.01) | |
| *D21C 9/00* | (2006.01) | |
| *B29B 17/02* | (2006.01) | |
| *D21C 3/04* | (2006.01) | |
| *B29L 31/48* | (2006.01) | |

(52) U.S. Cl.
CPC ................ *D21C 5/02* (2013.01); *B29B 17/02* (2013.01); *D21C 3/04* (2013.01); *D21C 9/00* (2013.01); *B29L 2031/4878* (2013.01); *Y02W 30/62* (2015.05); *Y02W 30/64* (2015.05)

(58) Field of Classification Search
USPC .......................................................... 162/5
See application file for complete search history.

(56) References Cited

U.S. PATENT DOCUMENTS

| | | |
|---|---|---|
| 4,525,527 A | 6/1985 | Takeda et al. |
| 5,292,075 A | 3/1994 | Bartlett |
| 6,475,338 B1 | 11/2002 | Jiang et al. |
| 2007/0137805 A1 | 6/2007 | Gerber et al. |
| 2013/0131332 A1 | 5/2013 | Shoseyov et al. |
| 2016/0237617 A1* | 8/2016 | Yamaguchi ............. D21C 5/02 |

FOREIGN PATENT DOCUMENTS

| | | | |
|---|---|---|---|
| EP | 0592789 A2 | 4/1994 | |
| JP | 58-127714 A | 7/1983 | |
| JP | 06-089007 A | 3/1994 | |
| JP | H06-502454 A | 3/1994 | |
| JP | 08-092888 A | 4/1996 | |
| JP | 10-072788 A | 3/1998 | |
| JP | 2004-009007 A | 1/2004 | |
| JP | 2004-042038 A | 2/2004 | |
| JP | 2004-115975 A | 4/2004 | |
| JP | 2004-190149 A | 7/2004 | |
| JP | 2007-150196 A | 6/2007 | |
| JP | 2003-225645 A | 8/2007 | |
| JP | 2007-270383 A | 10/2007 | |
| JP | 2009-183893 A | 8/2009 | |
| JP | 2009-256463 A | 11/2009 | |
| JP | 2010-59586 A | 3/2010 | |
| JP | 2010-084031 A | 4/2010 | |
| JP | 2011-38197 A | 2/2011 | |
| JP | 2013-108963 A | 6/2013 | |
| JP | 2013-132600 A | 7/2013 | |
| JP | 2013-225937 | * 10/2013 | ............... D21C 5/02 |
| WO | 92/07995 A1 | 5/1992 | |
| WO | 96/36764 A1 | 11/1996 | |
| WO | 2014/168179 A1 | 10/2014 | |

OTHER PUBLICATIONS

International Search Report dated Dec. 9, 2014, corresponding to International application No. PCT/JP2014/073345.

* cited by examiner

*Primary Examiner* — Mark Halpern
(74) *Attorney, Agent, or Firm* — Hauptman Ham, LLP

(57) ABSTRACT

Provided is a process for recovering pulp fiber from used sanitary goods which contain both pulp fiber and a superabsorbent polymer and producing a recycled pulp which contains little ash and which is reusable for sanitary goods. This process comprises: a calcium treatment step for treating used sanitary goods with a water-soluble calcium compound and thereby conducting the dehydration of a superabsorbent polymer contained in the used sanitary goods; a disintegration step for applying a physical force to the used sanitary goods to disintegrate the used sanitary goods into pulp fiber and other materials; a separation step for separating the pulp fiber from a pulp fiber/other materials mixture which has been formed in the disintegration step; a disinfecting step using a disinfectant; and a citric acid treatment step for subjecting the separated pulp fiber to treatment with an aqueous citric acid solution at an acidic pH.

8 Claims, 2 Drawing Sheets

PROCESS FOR MANUFACTURING RECYCLED PULP FROM USED SANITARY GOODS

RELATED APPLICATIONS

The present application is a Divisional Application of U.S. patent application Ser. No. 15/024,713, filed Mar. 24, 2016, which is a National Phase of International Application Number PCT/JP2014/073345, filed Sep. 4, 2014, and claims priority to Japanese Application Number 2013-225937, filed Oct. 30, 2013. The disclosures of the above-listed applications are hereby incorporated by reference herein in their entirety.

TECHNICAL FIELD

The present invention relates to a process for manufacturing recycled pulp that is reusable for sanitary goods, by recovering pulp fiber from used sanitary goods which contain pulp fiber and a superabsorbent polymer.

BACKGROUND ART

There is a trend toward recovery and reuse of pulp from used sanitary goods. Sanitary goods generally include an absorbent body, the absorbent body being composed of pulp and a superabsorbent polymer. In order to recover pulp from used sanitary goods, therefore, it is necessary to separate the pulp and the superabsorbent polymer. However, separation of superabsorbent polymers and pulp that have swelled by absorption of water is not easy to accomplish. Separation is carried out by treatment with water-soluble calcium compounds such as hydrated lime, calcined lime and calcium chloride, separating out the superabsorbent polymer by dehydration, sedimentation, dry sorting (for example, air sorting) and sifting. (Patent Literature 1, Patent Literature 2).

Since in the production of pulp, metals such as iron, copper or manganese in the pulp promote decomposition of oxygen-based bleaching chemicals, resulting in wasteful consumption of the oxygen-based bleaching chemicals, PTL 3 and PTL 4 disclose methods in which prior to the bleaching step, the metals are treated with an inorganic acid, organic acid or chelating agent and removed. However, these prior art documents do not focus on removal of calcium.

CITATION LIST

Patent Literature

[Patent Literature 1] Japanese Unexamined Patent Publication No. 2010-84031
[Patent Literature 2] Japanese Unexamined Patent Publication No. 2004-42038
[Patent Literature 3] Japanese Unexamined Patent Publication No. H10-72788
[Patent Literature 4] Japanese Unexamined Patent Publication No. 2007-270383

DISCLOSURE OF THE INVENTION

Problems to be Solved by the Invention

Pulp recovered by treating used sanitary goods with water-soluble calcium compounds such as hydrated lime, calcined lime or calcium chloride and dehydrating the superabsorbent polymer to separate out the pulp (hereunder referred to as "recovered pulp") has a high concentration of ash residue due to calcium, and has been unsuitable for reuse in sanitary goods.

The present invention provides a process for recovering recycled pulp from used sanitary goods, which has a low ash content and is reusable in sanitary goods.

Means for Solving the Problems

The present inventors have completed this invention upon finding that if used sanitary goods are treated with a water-soluble calcium compound, the superabsorbent polymer is dehydrated and the pulp separated, and the recovered pulp is treated with an aqueous citric acid solution, it is possible to effectively obtain recycled pulp with a low ash content, that is reusable in sanitary goods.

Specifically, the invention is a process for manufacturing recycled pulp that is reusable for sanitary goods, by recovering pulp fiber from used sanitary goods containing pulp fiber and a superabsorbent polymer, the process comprising:

a calcium treatment step in which used sanitary goods are treated with a water-soluble calcium compound to dehydrate the superabsorbent polymer in the used sanitary goods, a disintegration step in which the used sanitary goods are subjected to physical force to disintegrate the used sanitary goods into pulp fiber and other materials, a separation step in which pulp fiber is separated from a mixture of pulp fiber and other materials generated in the disintegration step, a disinfection step using a disinfectant, and a citric acid treatment step in which the separated pulp fiber is treated with an aqueous citric acid solution at an acidic pH.

The invention encompasses the following aspects.

[1] A process for manufacturing recycled pulp that is reusable for sanitary goods, by recovering pulp fiber from used sanitary goods containing pulp fiber and a superabsorbent polymer, the process comprising:

a calcium treatment step in which used sanitary goods are treated with a water-soluble calcium compound to dehydrate the superabsorbent polymer in the used sanitary goods, a disintegration step in which the used sanitary goods are subjected to physical force to disintegrate the used sanitary goods into pulp fiber and other materials, a separation step in which pulp fiber is separated from a mixture of pulp fiber and other materials generated in the disintegration step, a disinfection step using a disinfectant, and a citric acid treatment step in which the separated pulp fiber is treated with an aqueous citric acid solution at an acidic pH.

[2] The process according to claim 1, wherein the pH in the citric acid treatment step is in the range of 2 to 6.

[3] The process according to [1] or [2], further comprising a rinsing step.

[4] Recycled pulp with an ash content of less than 4.0% by weight, produced by the process according to any one of [1] to [3].

[5] Recycled pulp according to [4], exhibiting a weakly acidic pH as a solution of 10 g of recycled pulp added to and impregnated with 100 mL of ion-exchanged water.

[6] Recycled pulp according to [4] or [5], wherein the recycled pulp is used in at least one type from among absorbent bodies, tissues and nonwoven fabrics composing sanitary goods.

Effect of the Invention

The recycled pulp produced according to the invention has an ash content sufficiently low to allow its reuse for sanitary goods.

MODE FOR CARRYING OUT THE INVENTION

The present invention relates to a process for manufacturing recycled pulp that is reusable for sanitary goods, by recovering pulp fiber from used sanitary goods containing pulp fiber and a superabsorbent polymer.

The sanitary goods are not particularly restricted so long as they contain pulp fiber and a superabsorbent polymer, and examples include disposable diapers, incontinence pads, urine-absorbing pads, sanitary napkins and panty liners. Among these, they are preferably incontinence pads or disposable diapers recovered in mass from institutions or the like, as they require no effort for separation and have relatively large amounts of pulp.

There are no particular restrictions on the pulp fiber, and examples include fluffy pulp fiber and chemical pulp filaments.

A superabsorbent polymer (SAP) has a three-dimensional network structure with an appropriately crosslinked water-soluble polymer and therefore absorbs a few ten to a few hundred times its weight of water, but it is essentially water-insoluble and the absorbed water does not emerge even with some degree of pressure application; examples thereof include starch-based, acrylic acid-based and amino acid-based particulate or fibrous polymers.

Throughout the present specification, pulp produced by the process of the invention will be referred to as "recycled pulp".

Figure 2:
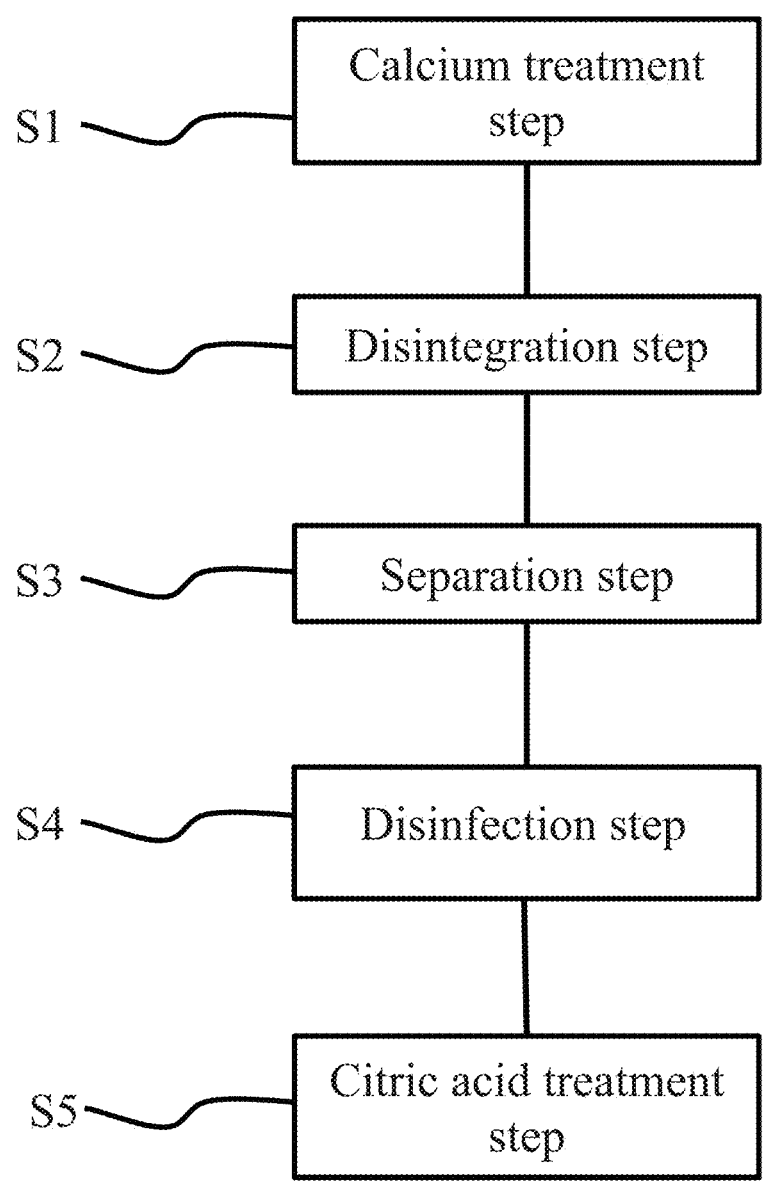
FIG. 2 is a flow chart showing a process of manufacturing recycled pulp according to one embodiment.

As shown in FIG. 2, a process of manufacturing recycled pulp according to one embodiment of the invention comprises:

a calcium treatment step S1 in which used sanitary goods are treated with a water-soluble calcium compound to dehydrate the superabsorbent polymer in the used sanitary goods, a disintegration step S2 in which the used sanitary goods are subjected to physical force to disintegrate the used sanitary goods into pulp fiber and other materials, wherein the disintegration step may be carried out after, before or simultaneously with the calcium treatment step, a separation step S3 in which pulp fiber is separated from a mixture of pulp fiber and other materials generated in the disintegration step, a disinfection step S4 using a disinfectant, wherein the disinfection step may be carried out immediately after the calcium treatment step, or immediately after the disintegration step, or immediately after the separation step, or immediately after the citric acid treatment step described below, or simultaneously with the calcium treatment step, or simultaneously with the disintegration step, or simultaneously with the separation step, or simultaneously with the citric acid treatment step, and a citric acid treatment step S5 in which the separated pulp fiber is treated with an aqueous citric acid solution at an acidic pH, wherein the citric acid treatment step is carried out after the separation step.

The process of the invention may further comprise a rinsing step if necessary.

The process of the invention comprises a calcium treatment step in which used sanitary goods are treated with a water-soluble calcium compound to dehydrate the superabsorbent polymer in the used sanitary goods.

In this step, the superabsorbent polymer that has swelled by absorption of water in the used sanitary goods is dehydrated by calcium ion.

The superabsorbent polymer has hydrophilic groups (for example, —COO$^-$), allowing water molecules to bond to the hydrophilic groups by hydrogen bonding, so that large amounts of water can be absorbed, and when the water-absorbed superabsorbent polymer is treated with the water-soluble calcium compound, presumably calcium ions bond to the hydrophilic groups (for example, —COO$^-$) (forming —COO—Ca—OCO—, for example), breaking the hydrogen bonds between the hydrophilic groups and the water molecules and releasing the water molecules, so that the superabsorbent polymer becomes dehydrated.

By dehydrating the superabsorbent polymer, separation between the pulp fiber and superabsorbent polymer becomes easier. When it is attempted to disinfect used sanitary goods that have not been subjected to calcium treatment, with an aqueous solution containing a disinfectant, the superabsorbent polymer absorbs the aqueous solution containing the disinfectant and temperature efficiency is lowered, but this can be avoided by first dehydrating the superabsorbent polymer by calcium treatment. When disinfection is carried out with an aqueous solution containing a disinfectant but no water-soluble calcium compound, since the superabsorbent polymer absorbs the water of the aqueous solution, unless the superabsorbent polymer is first dehydrated the solid concentration in the tank increases and mechanical disintegration operation becomes difficult, requiring the use of more aqueous solution.

The water-soluble calcium compound to be used in the disintegration step is not particularly restricted so long as it is a water-soluble calcium compound and dissolves in water thereby ionizing calcium ion, and examples include calcium chloride, calcium oxide (calcined lime), calcium hydroxide (hydrated lime) and the like. Calcium chloride and calcium oxide are preferred among these.

The method of treatment with the water-soluble calcium compound is not particularly restricted so long as it is a method that allows the superabsorbent polymer in the used sanitary goods to contact with the water-soluble calcium compound, and for example, it may be a method of directly sprinkling the solid water-soluble calcium compound onto the used sanitary goods, or a method of immersing the used sanitary goods into an aqueous solution of the water-soluble calcium compound.

The amount of water-soluble calcium compound used in the calcium treatment step is preferably 4 mol or greater, more preferably 4 to 40 mol and even more preferably 5 to 20 mol, per 1 kg of superabsorbent polymer (based on dry mass). While it is difficult to accurately determine the mass (dry mass) of a superabsorbent polymer from sanitary goods containing excreted fluid, as a general rule 5 to 15% by weight of sanitary goods containing excreted fluid corresponds to the mass (dry mass) of the superabsorbent polymer. If the amount of water-soluble calcium compound is too low, dehydration of the superabsorbent polymer will be inadequate. The water-soluble calcium compound will usually be loaded in excess, with the aim of amply ensuring treatment efficiency.

The time for the calcium treatment step is not particularly restricted so long as it is a sufficient time to allow the calcium ion to be taken up into the superabsorbent polymer.

The treatment time for the calcium treatment step is preferably 10 minutes or greater, more preferably 20 minutes to 2 hours and even more preferably 40 minutes to 90 minutes.

If the treatment time is too short, dehydration of the superabsorbent polymer may be insufficient. If the treatment time exceeds a certain value, the amount of calcium ion taken up into the superabsorbent polymer will become saturated, and therefore any treatment time exceeding that value is meaningless.

The temperature of treatment with the aqueous solution of the water-soluble calcium compound is not particularly restricted so long as it is a temperature at which calcium ion is taken up into the superabsorbent polymer, but it will usually be higher than 0° C. and lower than 100° C. Although room temperature is adequate, heating may be performed to increase the reaction rate. In the case of heating, it is preferably from room temperature to 60° C., more preferably from room temperature to 40° C., and even more preferably from room temperature to 30° C.

The amount of aqueous solution used for treatment with the aqueous solution of the water-soluble calcium compound is not particularly restricted so long as it is an amount allowing complete immersion of the used sanitary goods, but it is preferably 3 to 50 kg and more preferably 3 to 10 kg to 1 kg of waste-containing used sanitary goods. If the amount of aqueous solution is too small, it may not be possible to effectively agitate the used sanitary goods in the aqueous solution. If the amount of aqueous solution is too large, the water-soluble calcium compound may be wasted, increasing treatment costs.

When the used sanitary goods are to be immersed in the aqueous solution of the water-soluble calcium compound, agitation is not essential but is preferred.

Even when a solid water-soluble calcium compound is directly sprinkled onto the used sanitary goods, agitation is not essential but is preferred. If necessary, after a suitable period of time has passed after directly sprinkling the solid water-soluble calcium compound on the used sanitary goods, the minimum amount of water necessary to allow agitation may be supplied and agitation carried out.

The process of the invention comprises a disintegration step in which a physical force is acted on the used sanitary goods to disintegrate the used sanitary goods into pulp fiber and other materials.

Sanitary goods are usually composed of various materials such as pulp fiber, superabsorbent polymers, nonwoven fabrics and synthetic resin films. In the disintegration step, the used sanitary goods are disintegrated into each of these materials. The degree of disintegration need only be disintegration allowing at least a portion of the pulp fiber to be recovered, and it does not necessarily need to be complete and instead may be only partial.

The method of applying physical force to the used sanitary goods is not restricted, and examples include agitation, beating, puncturing, vibration, tearing, cutting, crushing or the like. Among these, agitation in water is preferred. The agitation may be carried out in a vessel equipped with a stirrer, such as a washing machine. The agitation conditions are not particularly restricted so long as the sanitary goods are disintegrated, and for example, the agitation time is preferably 5 to 60 minutes, more preferably 10 to 50 minutes and even more preferably 20 to 40 minutes.

The disintegration step may be carried out after the calcium treatment step, or it may be carried out before the calcium treatment step. For example, the used sanitary goods may be torn and the absorbent body and other materials disintegrated, and the disintegrated absorbent body or the disintegrated absorbent body and other materials may be treated with an aqueous solution of a water-soluble calcium compound. However, when the disintegration step is carried out before the calcium treatment step, the disintegration step is accomplished without using water. When water or a disinfectant is used in the disintegration step, the disintegration step is carried out after the calcium treatment step.

In addition, the disintegration step may be carried out separately from the calcium treatment step, or the calcium treatment step and the disintegration step may be carried out as a single step. That is, instead of carrying out the calcium treatment step and the disintegration step separately, a single calcium treatment/disintegration step may be provided in which calcium treatment and disintegration are carried out simultaneously. For example, the used sanitary goods, water-soluble calcium compound and water may be loaded into a washing machine, and agitation applied to an extent such that the used sanitary goods disintegrate, thereby allowing simultaneous calcium treatment and disintegration of the used sanitary goods.

The process of the invention comprises a separation step in which pulp fiber is separated from a mixture of pulp fiber and other materials generated in the disintegration step.

In the separation step, pulp fiber is separated from the mixture of the pulp fiber, dehydrated superabsorbent polymer and other materials generated by disintegration of the used sanitary goods. The method of separating the pulp fiber is not limited, and for example, it may be a method in which the difference in specific gravity of the disintegrated structural materials (pulp fiber, superabsorbent polymer, plastic, etc.) is utilized for precipitating separation in water, a method in which the disintegrated structural materials of different sizes are separated by passing them through a screen with a prescribed mesh, or a method of separation with a cyclone-type centrifugal separator.

The process of the invention also comprises a disinfection step using a disinfectant.

The disinfection step may be carried out by treatment of the material to be disinfected using a disinfectant. For example, it may be carried out by loading the material to be disinfected and the disinfectant into a vessel and causing agitation.

The disinfectant to be used in the disinfection step is not particularly restricted and may be an aqueous solution dissolving a disinfectant such as sodium hypochlorite or chlorine dioxide, or ozone water, electrolytic water (acidic electrolytic water) or the like, among which an aqueous sodium hypochlorite solution is preferred from the viewpoint of economy and general utility.

When using an aqueous solution dissolving a disinfectant, the disinfectant concentration is not particularly restricted so long as it is a concentration that can yield recycled pulp having the desired level of hygiene. The preferred concentration for the disinfectant will differ depending on the type of disinfectant, but in the case of sodium hypochlorite, it is 10 to 1000 ppm by mass, more preferably 30 to 500 ppm by mass and even more preferably 50 to 250 ppm by mass. If the concentration is too low it will not be possible to obtain a sufficient disinfecting effect, and bacteria and the like may reside in the recycled pulp. If the concentration is too high, not only will the disinfectant tend to be wasted but the material to be disinfected may also be damaged, and problems of safety may arise.

The amount of disinfectant to be used in the disinfection step is not particularly restricted so long as it is an amount that thoroughly soaks the material to be disinfected, but it is preferably 3 to 50 kg and more preferably 3 to 10 kg with respect to 1 kg of the material to be disinfected. If the amount of disinfectant is too small, it may not be possible to obtain a sufficient disinfecting effect. If the amount of disinfectant is too large, the disinfectant solution or disinfectant may be wasted and treatment costs may be increased.

The time for the disinfection step is not particularly restricted so long as it is a time that allows recycled pulp to be obtained having the desired level of hygiene, but it is preferably 10 to 120 minutes, more preferably 20 to 100 minutes and even more preferably 30 to 80 minutes.

When the disinfection step is carried out in a batch process, the disinfectant used is discarded upon completion of the disinfection step.

The disinfection step may be carried out immediately after the separation step, or immediately after the disintegration step, or immediately after the calcium treatment step, or immediately after the citric acid treatment step described below. When the disinfection step is carried out immediately after the separation step, the material to be disinfected will be pulp fiber, when the disinfection step is carried out immediately after the disintegration step, the material to be disinfected will be a mixture of pulp fiber and other materials generated in the disintegration step, when the disinfection step is carried out immediately after the calcium treatment step, the material to be disinfected will consist of the used sanitary goods that have completed dehydrating treatment, and when the disinfection step is carried out immediately after the citric acid treatment step, the material to be disinfected will be pulp fiber that has completed the citric acid treatment. When the pulp fiber is to be disinfected, it may be accomplished by immersing it in the disinfectant and, if necessary, agitated.

The disinfection step may also be carried out simultaneously with another step, instead of being performed separately.

For example, if the disinfectant is added to the aqueous solution of the water-soluble calcium compound to be used in the calcium treatment step, the calcium treatment step and the disinfection step can be carried out simultaneously. That is, instead of carrying out the calcium treatment step and the disinfection step separately, a single calcium treatment/disinfection step may be provided in which calcium treatment and disinfection step are carried out simultaneously.

Also, instead of carrying out the disintegration step and the disinfection step separately, there may be provided a single disintegration/disinfection step in which disintegration and disinfection are carried out simultaneously. For example, by carrying out disintegration of the used sanitary goods by agitation in a disinfectant, the disintegration step and the disinfection step can be carried out simultaneously.

Also, instead of carrying out the calcium treatment step, disintegration step and disinfection step separately, a single calcium treatment/disintegration/disinfection step may be provided in which calcium treatment, disintegration and disinfection step are carried out simultaneously. For example, if the disinfectant is added to the aqueous solution of the water-soluble calcium compound to be used in the calcium treatment step, and the agitation is performed to an extent causing disintegration of the used sanitary goods, then calcium treatment, disintegration and disinfection can be carried out simultaneously.

The process of the invention comprises a citric acid treatment step in which the separated pulp fiber is treated with an aqueous citric acid solution at an acidic pH.

In the citric acid treatment step, the calcium compounds residing in the pulp fiber are removed.

Treatment with the water-soluble calcium compound in the calcium treatment step causes adhesion of calcium ions and various calcium compounds on the surface of the separated pulp fiber. The calcium compounds adhering to the pulp fiber are not necessarily limited to water-soluble compounds and include insoluble and poorly soluble compounds, which cannot be removed by rinsing alone. Citric acid forms a chelate with calcium resulting in water-soluble calcium citrate, and can therefore effectively dissolve and remove insoluble or poorly soluble calcium compounds adhering to the surface of the pulp fiber. Since citric acid can also form chelates with metals other than calcium, when insoluble or poorly soluble metal compounds other than calcium compounds are adhering to the surface of the pulp fiber, it is possible to dissolve and remove not only the calcium compounds but also the insoluble or poorly soluble metal compounds other than the calcium compounds. As a result, it is possible to reduce the ash content of the obtained recycled pulp.

The following advantages are afforded by using citric acid.

Firstly, citric acid is acidic and thus, depending on the set conditions including the washing step, it is possible to control the pH of the recycled pulp to a weakly acidic range which is favorable for skin.

Secondly, because citric acid is not a hazardous substance for the human body, it is highly safe even if the citric acid remains in the obtained recycled pulp.

Thirdly, since citric acid is a mildly weak acid compared to the acid used in the pulp purification, it can reduce damage to the obtained recycled pulp.

Fourthly, citric acid can be obtained relatively cheaply, thereby lowering cost for recovery and regeneration.

Fifthly, citric acid is odorless and therefore does not impair the working environment.

Sixthly, it does not require major equipment investment, allowing existing facilities to be employed.

The concentration of the aqueous citric acid solution used in the citric acid treatment step is not particularly restricted so long as it is a concentration that allows adjustment to the prescribed pH and can adequately reduce the ash content, but it is preferably 5 to 250 mol/m$^3$. If the concentration is too low, it will not be possible to adequately reduce the ash content. If the concentration is too high, waste of the citric acid may result, running up treatment costs.

The amount of aqueous citric acid solution to be used in the acid treatment step is not particularly restricted so long as it is an amount that thoroughly soaks the material to be treated, but it is preferably 3 to 50 kg and more preferably 3 to 10 kg with respect to 1 kg of the material to be treated. If the amount of aqueous solution is too low, it will not be possible to adequately reduce the ash content. If the amount of aqueous solution is too high, waste of the citric acid may result, increasing the treatment cost.

The citric acid treatment step is carried out at an acidic pH. That is, the acid treatment is carried out at a pH of lower than 7. When an alkaline calcium compound has been used in the disintegration step, alkaline calcium compounds often reside in the pulp fiber that is supplied to the acid treatment step, and addition of this pulp fiber to the aqueous citric acid solution will sometimes alter the pH of the aqueous citric acid solution. When the pH of the aqueous citric acid solution differs from before and after addition of the pulp fiber, the pH in the acid treatment step in such a case refers to the pH of the aqueous citric acid solution after addition of the pulp fiber.

For adjustment of the pH, for example, the pulp fiber and water are placed in a treatment tank, successively adding citric acid while stirring, and the citric acid addition is halted once the pH of the solution in the treatment tank reaches the prescribed pH.

The pH in the citric acid treatment step is preferably 2 to 6, more preferably 2 to 4.5, even more preferably 2 to 3.5 and yet more preferably 2 to 3.

If the pH is too low, the water absorption factor of the obtained recycled pulp may be lowered. If only the ash content is a concern, the obtained recycled pulp will be reusable as sanitary goods even with a low pH, but when the water absorption factor is also a consideration, the pH is preferably 2 or higher. The reason for a low water absorption factor of the obtained recycled pulp when the pH is too low is not clearly understood, but may be because the pulp fiber itself undergoes a transformation.

If the pH is too high, the ash content of the obtained recycled pulp will tend to increase. So long as treatment is at a pH of below 7, the ash content in the pulp fiber that has passed through the disintegration step can be reduced to a level allowing reuse as sanitary goods, but considering that the standard for sanitary product materials established by the Japan Hygiene Products Industry Association is an ash content of no higher than 0.65%, the pH is preferably 3.5 or lower.

Also, if the pH is too high, the water absorption factor of the obtained recycled pulp will tend be lowered. The reason for which the water absorption factor of the recycled pulp cannot be adequately restored with a high pH is not completely understood, but it is possible that inorganic materials such as insoluble or poorly soluble calcium compounds adhering onto the surface of the pulp fiber lower the hydrophilicity of the pulp fiber and reduce the water absorption factor, and when the pH is high it is not possible to thoroughly remove the inorganic materials such as insoluble or poorly soluble calcium compounds adhering to the surface of the pulp fiber, resulting in insufficient restoration of the water absorption factor. From the viewpoint of the water absorption factor, the pH is preferably 4.5 or lower.

The time for the citric acid treatment step is not particularly restricted so long as it is a time allowing the ash content to be lowered, but it is preferably 1 to 80 minutes, more preferably 2 to 40 minutes and even more preferably 4 to 20 minutes. If the treatment time is too short, it will not be possible to adequately reduce the ash content. If the treatment time is too long, treatment costs may increase.

The temperature in the citric acid treatment step is not particularly restricted so long as it is a temperature that allows the ash content to be lowered. The aqueous citric acid solution may be heated if necessary, but alternatively room temperature may be maintained.

While agitation of the aqueous citric acid solution is not essential in the citric acid treatment step, a moderate degree of agitation is preferred.

The citric acid treatment step is carried out at a later stage than the separation step. That is, citric acid treatment is carried out after the pulp fiber has been separated from the dehydrated superabsorbent polymer. If citric acid treatment is carried out at a stage in which the dehydrated superabsorbent polymer has not yet been separated, then the superabsorbent polymer will reabsorb water and the treatment efficiency will be reduced.

The citric acid-treated pulp fiber is preferably rinsed with water in the rinsing step.

The method for rinsing the pulp fiber is not particularly restricted, and for example, it may be accomplished by simple water rinsing. Water rinsing can be carried out in a batch system or a semi-batch system, or even in a circulating system. When carried out in a batch system, the water rinsing may be performed using a washing machine, for example.

The rinsing conditions are not particularly restricted so long as they allow adequate removal of substances other than the pulp fiber, and for example, the rinsing time in a batch system is preferably 1 to 80 minutes, more preferably 2 to 40 minutes and even more preferably 4 to 20 minutes. When carried out in a batch system, the amount of water used is preferably 3 to 50 kg and more preferably 3 to 10 kg with respect to 1 kg of the material to be rinsed.

The rinsed pulp fiber may then be dehydrated in a dehydration step, if necessary.

The method for dehydrating the rinsed pulp fiber is not particularly restricted, and for example, it may be accomplished by dehydrating the rinsed pulp fiber with a dehydrator such as a centrifugal separator.

The dehydrating conditions are not particularly restricted so long as they allow the moisture content to be lowered to the target value, but for example, the dehydrating time is preferably 1 to 10 minutes, more preferably 2 to 8 minutes and even more preferably 3 to 6 minutes.

The rinsing step and dehydration step may be carried out once each, or they may be repeated several times in alternate fashion.

The pulp fiber that has been subjected to citric acid treatment and, if necessary, rinsing and dehydration, is then dried in a drying step if necessary.

The method for drying the pulp fiber is not particularly restricted, and for example, it may be accomplished using a dryer such as a hot air drier.

The drying conditions are not particularly restricted so long as they allow adequate drying of the pulp fiber, and for example, the drying temperature is preferably 80 to 200° C., more preferably 90 to 150° C. and even more preferably 100 to 120° C. The drying time is preferably 10 minutes to 30 hours and more preferably 20 to 60 minutes.

The moisture content of the dried pulp fiber is preferably 5 to 13% by weight, more preferably 6 to 12% by weight and even more preferably 7 to 11% by weight. If the moisture content is too low, the hydrogen bonds may become too strong resulting in excessive hardness, while conversely if the moisture content is too high, mold and the like may be generated.

The moisture content of the pulp fiber is measured in the following manner. The measurement is conducted in an atmosphere of 20° C.±1° C.

(1) The mass A (g) of the vessel into which the sample to be measured will be placed (a non-covered vessel) is measured.

(2) Approximately 5 g of the sample to be measured is prepared and placed in the vessel whose mass was measured in (1), and the mass B (g) of the sample-containing vessel is measured.

(3) The sample-containing vessel is placed for 2 hours in an oven set at a temperature of 105° C.±3° C.

(4) The sample-containing vessel is removed from the oven and placed for 30 minutes in a desiccator (desiccant: colored silica gel-containing substance).

(5) The sample-containing vessel is removed from the desiccator and the mass C (g) is measured.

(6) The moisture content (%) is calculated by the following formula.

Moisture content (%)=$(B-C)/(C-A) \times 100$

The dried pulp fiber is preferably worked into a form such as a sheet, roll or mass, that can be easily managed in the production equipment for sanitary goods, and reused.

In the process of the invention, a rinsing step and/or a dehydration step may be provided immediately after the calcium treatment step. A rinsing step and/or a dehydration step may also be provided immediately after the disintegration step. A rinsing step and/or a dehydration step may also be provided immediately after the separation step, as well. In addition, a rinsing step and/or a dehydration step may be provided immediately after the disinfection step. The rinsing step and dehydration step may be carried out in the same manner as the rinsing step and dehydration step following the acid treatment step.

The process of the invention includes, but is not limited to, the following modes.

(a) Calcium treatment step→disintegration step→separation step→disinfection step→citric acid treatment step (b) Calcium treatment step→disintegration step→separation step→disinfection step→citric acid treatment step→dehydration step→drying step (c) Calcium treatment step→disintegration step→separation step→disinfection step→citric acid treatment step→rinsing step→dehydration step→drying step (d) Calcium treatment step→disintegration step→separation step→disinfection step→dehydration step→citric acid treatment step→rinsing step→dehydration step→drying step (e) Calcium treatment step→disintegration step→separation step→disinfection step→rinsing step→dehydration step→citric acid treatment step→rinsing step→dehydration step→drying step (f) Calcium treatment step→disintegration step→separation step→dehydration step→disinfection step→dehydration step→citric acid treatment step→rinsing step→dehydration step→drying step (g) Calcium treatment step→disintegration step→rinsing step→separation step→dehydration step→disinfection step→dehydration step→citric acid treatment step→rinsing step→dehydration step→drying step (h) Calcium treatment step→rinsing step→disintegration step→separation step→dehydration step→disinfection step→rinsing step→dehydration step→citric acid treatment step→rinsing step→dehydration step→drying step (i) Calcium treatment step→rinsing step→disintegration step→separation step→rinsing step→dehydration step→disinfection step→rinsing step→dehydration step→citric acid treatment step→rinsing step→dehydration step→drying step (j) Calcium treatment step→disintegration/disinfection step→separation step→citric acid treatment step (k) Calcium treatment step→disintegration/disinfection step→rinsing step→separation step→dehydration step→citric acid treatment step→rinsing step→dehydration step→drying step (l) Calcium treatment/disinfection step→disintegration step→separation step→citric acid treatment step (m) Calcium treatment/disinfection step→rinsing step→disintegration step→separation step→rinsing step→dehydration step→citric acid treatment step→rinsing step→dehydration step→drying step (n) Calcium treatment/disintegration/disinfection step→separation step→citric acid treatment step (o) Calcium treatment/disintegration/disinfection step→rinsing step→separation step→dehydration step→citric acid treatment step→rinsing step→dehydration step→drying step (p) Disintegration step→calcium treatment step→separation step→disinfection step→citric acid treatment step (q) Disintegration step→calcium treatment step→rinsing step→separation step→disinfection step→dehydration step→citric acid treatment step→rinsing step→dehydration step→drying step Recycled pulp obtained by the process of the invention preferably has an ash content of less than 4.0% by weight. More preferably, it is recycled pulp that is reusable in a sanitary napkin, having an ash content of no greater than 0.65% by weight.

The method of measuring the ash content is described below.

Recycled pulp obtained by the process of the invention preferably has a water absorption factor of 7.0 g/g.

The method of measuring the water absorption factor is also described below.

Recycled pulp obtained by the process of the invention preferably exhibits a weakly acidic pH as a solution of 10 g of the recycled pulp added to and impregnated with 100 mL of ion-exchanged water. Here, "weakly acidic" means a pH in the range of about 3 to 6.

Recycled pulp obtained by the process of the invention is preferably used in at least one from among absorbent bodies, tissues and nonwoven fabrics composing sanitary goods.

EXAMPLES

In the examples, recovered pulp produced by the method described in Japanese Unexamined Patent Publication No. 2010-84031 was subjected to citric acid treatment, and the effect of the citric acid treatment was confirmed. The recovered pulp used had an ash content of 8.51% by weight and a water absorption factor of 6.0 g/g. Upon component analysis of the ash, the elements composing the ash were found to be 93.055 mol % Ca, 6.046 mol % Si, 0.535 mol % K, 0.179 mol % Fe, 0.125 mol % Sr and 0.059 mol % Zn. Ca components were found to occupy the major portion of the ash. Moreover, X-ray analysis of the Ca component indicated presence in forms such as CaO, $CaCO_3$ and $Ca(OH)_2$.

A 15 g portion of the recovered pulp was placed in a 2 liter beaker containing 750 g of citric acid solution at different concentrations, and a stirrer (MAZELA Z-1210 by Eyela) was used for stirring for 10 minutes at 600 rpm. The pH of the supernatant liquid in the beaker was measured with a pH meter (Model Twin pH AS-212 by Horiba). Drainage was performed using a 250-mesh net. The recovered pulp was returned to the beaker and subjected to water rinsing for 10 minutes with 750 g of ion-exchanged water. Drainage was performed using a 250-mesh net. Drying was carried out for 24 hours with a hot air drier at 105° C. to obtain recycled pulp.

The ash content and water absorption factor of the obtained recycled pulp were measured. The measuring methods for the ash content and water absorption factor were as described below.

The pH, ash content and water absorption factor values are shown in Table 1.

[Ash Content]

The ash content (% by weight) was measured according to "5. Ash content test method" in accordance with the Sanitary Material Standards. The specific procedure was as follows.

A platinum, quartz or magnetic crucible is strongly preheated at 500 to 550° C. for 1 hour, and after standing to cool, the mass $W_0$ is precisely measured. Separately, in addition to the reference, 2 to 4 g of sample is taken and placed in the crucible, the mass $W_1$ is precisely measured, removing or displacing the cover of the crucible if necessary, and gentle heating is preferred first, followed by gradual increase in the temperature to strong heating at 500 to 550° C. for 4 hours or longer, ashing it until no more carbides remain. After being allowed to cool, the mass is precisely measured. The residue is again asked, and after being allowed to cool, the mass is precisely measured, and ashing, cooling and mass measurement are repeated until a constant mass is reached. When carbides remain and no constant mass is reached by using this method, hot water is added to produce leaching, filtration is performed using quantitative analysis filter paper, and the residue is strongly heated until no carbides are left with the filter paper or with the impurities on the filter paper. After adding the filtrate thereto, the mixture is evaporated to dryness and strongly heated. It is allowed to cool, and the mass is precisely measured. When carbides remain even with this method, a small amount of ethanol is added to wet it, the carbides are broken up with a glass rod, the glass rod is washed with a small amount of ethanol, and after evaporation while monitoring ethanol, the same procedure as before is repeated. The cooling is accomplished with a desiccator containing silica gel. Upon reaching a constant mass, the mass is recorded as $W_2$. The ash content (% by weight) is calculated by the following formula.

Ash content (% by weight)=$(W_2-W_0)/(W_1-W_0) \times 100$

[Water Absorption Factor]

The water absorption factor (g/g) was measured by the "D/W" method (Demand Wettability method).

Figure 1:
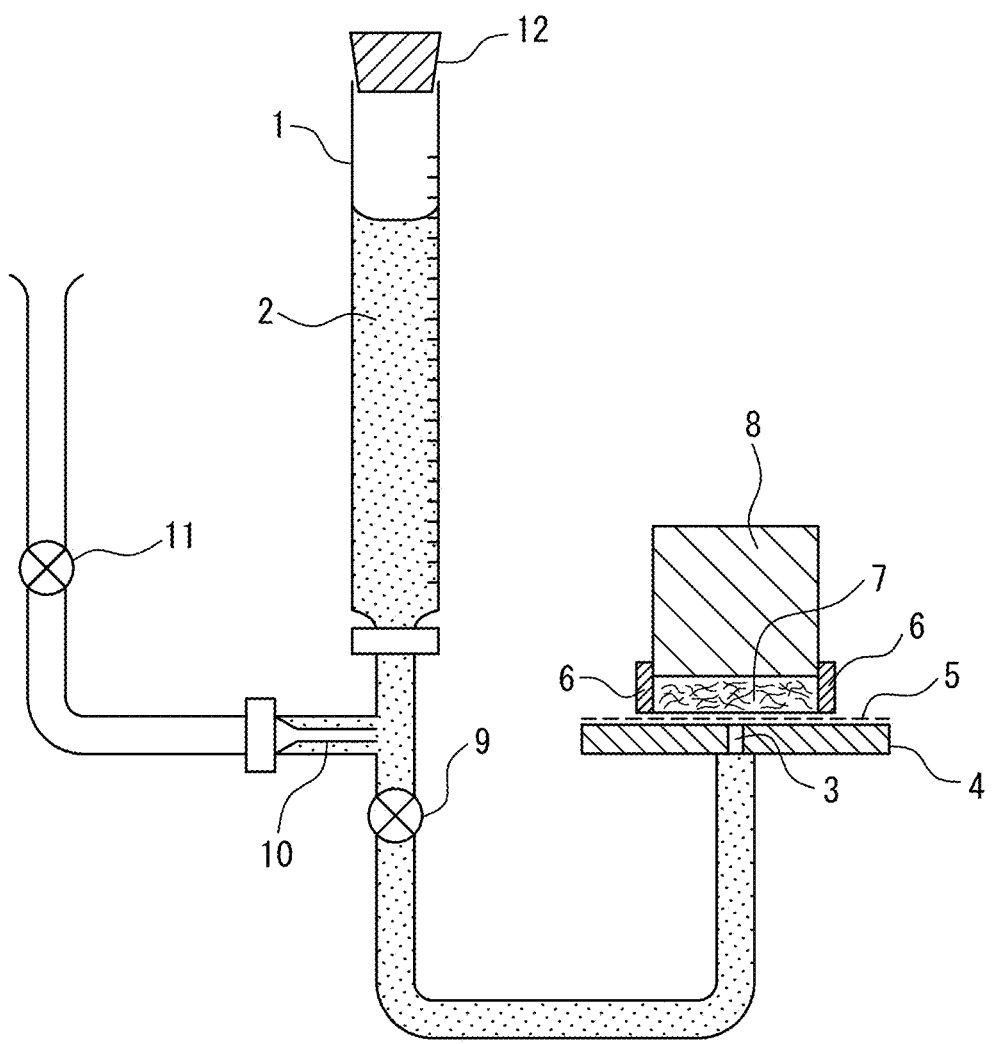
FIG. 1 is a schematic diagram showing an apparatus for measurement of the water absorption factor.

For the measurement there was used a Demand Wettability device (hereunder abbreviated as "D/W device") by Taiyo Create Co., Ltd. FIG. 1 shows an overview of a D/W device. In FIG. 1, 1 is a burette, 2 is a 0.9% sodium chloride aqueous solution, 3 is a liquid outlet, 4 is a support plate, 5 is a nylon net, 6 is an acrylic cylinder, 7 is pulp, 8 is a deadweight, 9 is a cock, 10 is an air inlet tube, 11 is a valve and 12 is a rubber stopper.

The specific procedure for the measurement was as follows.

(1) A 0.9% sodium chloride aqueous solution 2 is introduced through the burette 1 of the D/W device.

(2) With one drop discharged from the liquid outlet 3, a 10 cm-square 250 mesh nylon net (NBC Meshtec, Inc.) 5 is placed on the support plate 4.

(3) The liquid outlet 3 and center are aligned, and the acrylic cylinder 6 with an inner diameter of 33 mm is placed thereon and filled with a precisely weighed 1.00 g portion of pulp.

(4) A 200 g deadweight 8 matching the inner diameter of the cylinder is placed on the pulp 7.

(5) The cock 9 is opened, and the stopwatch is started simultaneously when foam begins to exit.

(6) After 60 seconds, the cock 9 is closed and the mass A (g) of the pulp 7 in the cylinder is measured.

(7) The water absorption factor (g/g) is calculated by the following formula.

Water absorption factor=$(A-1.00)/1.00$

TABLE 1

| No. | Material | pH | Ash content (% by weight) | Water absorption factor (g/g) | Ratio of water absorption factor with respect to virgin pulp (%) |
|---|---|---|---|---|---|
| 1 | Citric acid-treated product | 1.94 | 0.09 | 6.2 | 84 |
| 2 | Citric acid-treated product | 2.95 | 0.30 | 7.3 | 99 |
| 3 | Citric acid-treated product | 3.52 | 0.82 | 7.2 | 97 |
| 4 | Citric acid-treated product | 4.24 | 1.40 | 7.2 | 97 |
| 5 | Citric acid-treated product | 5.34 | 1.90 | 7.0 | 95 |
| 6 | Citric acid-treated product | 9.02 | 4.10 | 6.9 | 93 |
| 7 | Water-rinsed product (no citric acid used) | 10.29 | 4.00 | 6.8 | 92 |
| 8 | Untreated recycled pulp | — | 8.51 | 6.0 | 81 |
| 9 | Virgin pulp | — | 0.18 | 7.4 | 100 |

As is seen from the results in Table 1, citric acid treatment with the pH in an acidic range yielded a product which had a low ash content and was reusable for sanitary goods.

Moreover, citric acid treatment in an acidic range of pH 2 or greater yielded a product having a water absorption factor of 7.0 g/g or greater, and recovery was seen to a water absorption factor of 95% or greater with respect to the virgin pulp (unused pulp product). Although the water absorption factor was of a level suitable for reusable for sanitary goods with treatment at pH 1.94, the water absorption factor tended to decrease. The reason for this is unclear but is believed to be that the pulp itself may have undergone a transformation.

INDUSTRIAL APPLICABILITY

Recycled pulp obtained by the process of the invention can be reused in sanitary goods. In particular, it can be used in absorbent bodies, tissues or nonwoven fabrics composing sanitary goods.

The invention claimed is:

1. Recycled pulp, wherein
the recycled pulp has an ash content of less than 4.0% by mass, and exhibits a water absorption factor of 7.0 g/g or more, and
the recycled pulp is recovered from used sanitary goods, wherein the used sanitary goods contain pulp fiber and a superabsorbent polymer, and the recycled pulp is reusable for sanitary goods.

2. Recycled pulp according to claim 1, wherein the recycled pulp exhibits a pH of 3 to 6 as a solution of 10 g of recycled pulp added to and impregnated with 100 mL of ion-exchanged water.

3. Recycle pulp according to claim 1, wherein the recycled pulp exhibits a recovery of the water absorption factor of 95% or more with respect to a virgin pulp.

4. Recycle pulp according to claim 2, wherein the recycled pulp exhibits a recovery of the water absorption factor of 95% or more with respect to a virgin pulp.

5. Recycle pulp according to claim 1, wherein the recycled pulp has a moisture content of 5 to 13% by mass after drying.

6. Recycled pulp according to claim 1, wherein the recycled pulp is usable in at least one from among absorbent bodies, tissues and nonwoven fabrics composing sanitary goods.

7. Recycle pulp according to claim 1, wherein the recycled pulp has the ash content of less than 1.9% by mass.

8. Recycle pulp according to claim 1, comprising a citric acid.

* * * * *